United States Patent [19]

Strickland

[11] Patent Number: 5,025,974
[45] Date of Patent: Jun. 25, 1991

[54] PROCESS FOR PRODUCING COMPOSITE METALLIC STRUCTURES

[75] Inventor: George Strickland, Preston, United Kingdom

[73] Assignee: British Aerospace Plc, London, England

[21] Appl. No.: 376,503

[22] Filed: Jul. 7, 1989

[30] Foreign Application Priority Data

Jul. 7, 1988 [GB] United Kingdom ............... 8816179

[51] Int. Cl.$^5$ .................. B23K 20/08; B23K 20/18; B23K 101/02; B23K 103/10
[52] U.S. Cl. .................................... 228/107; 228/118; 228/157; 228/193; 228/263.17; 228/231; 228/220
[58] Field of Search ........... 228/118, 107, 157, 263.21, 228/193, 265, 231, 263.17; 148/11.5 A

[56] References Cited

U.S. PATENT DOCUMENTS

| 3,449,819 | 6/1969 | Blank | 228/107 |
| 4,577,798 | 3/1986 | Rainville | 228/157 |
| 4,612,259 | 9/1986 | Ueda | 428/661 |
| 4,661,172 | 4/1987 | Skinner et al. | 148/11.5 A X |
| 4,732,312 | 3/1988 | Kennedy et al. | 228/157 |
| 4,786,337 | 11/1988 | Martin | 148/11.5 A |
| 4,811,766 | 3/1989 | Sastry et al. | 148/11.5 A |

FOREIGN PATENT DOCUMENTS 1130527 3/1966 United Kingdom .
1433632 5/1973 United Kingdom .

OTHER PUBLICATIONS

Patent Abstracts of Japan vol. 10, No. 342, Jan. 23, 1987.
Production Progress in Advanced Metalforming for Aerospace Metallurgia, Jan. 1985, p. 16.
Explosive bonding and its Applicability to Titanium R. Hardwick (Source of Publication Cannot be Traced).

Primary Examiner—Kenneth J. Ramsey
Attorney, Agent, or Firm—Kerkam, Stowell, Kondracki & Clarke

[57] ABSTRACT

A process is described of preparing composite articles of aluminium or aluminium alloy suitable for superplastic forming by explosion welding two or more components together and heating the welded article to consolidate the bonds. The welds do not extend into areas to which a stop-off composition has been applied and the article can be superplastically formed by passing a pressurized fluid into these stopped-off areas.

23 Claims, 3 Drawing Sheets

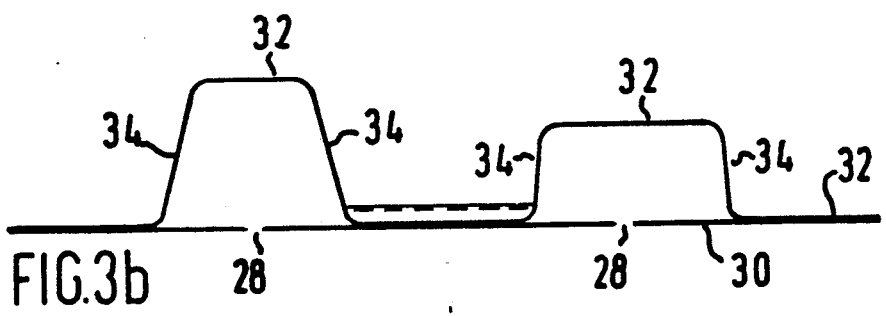
FIG.3b
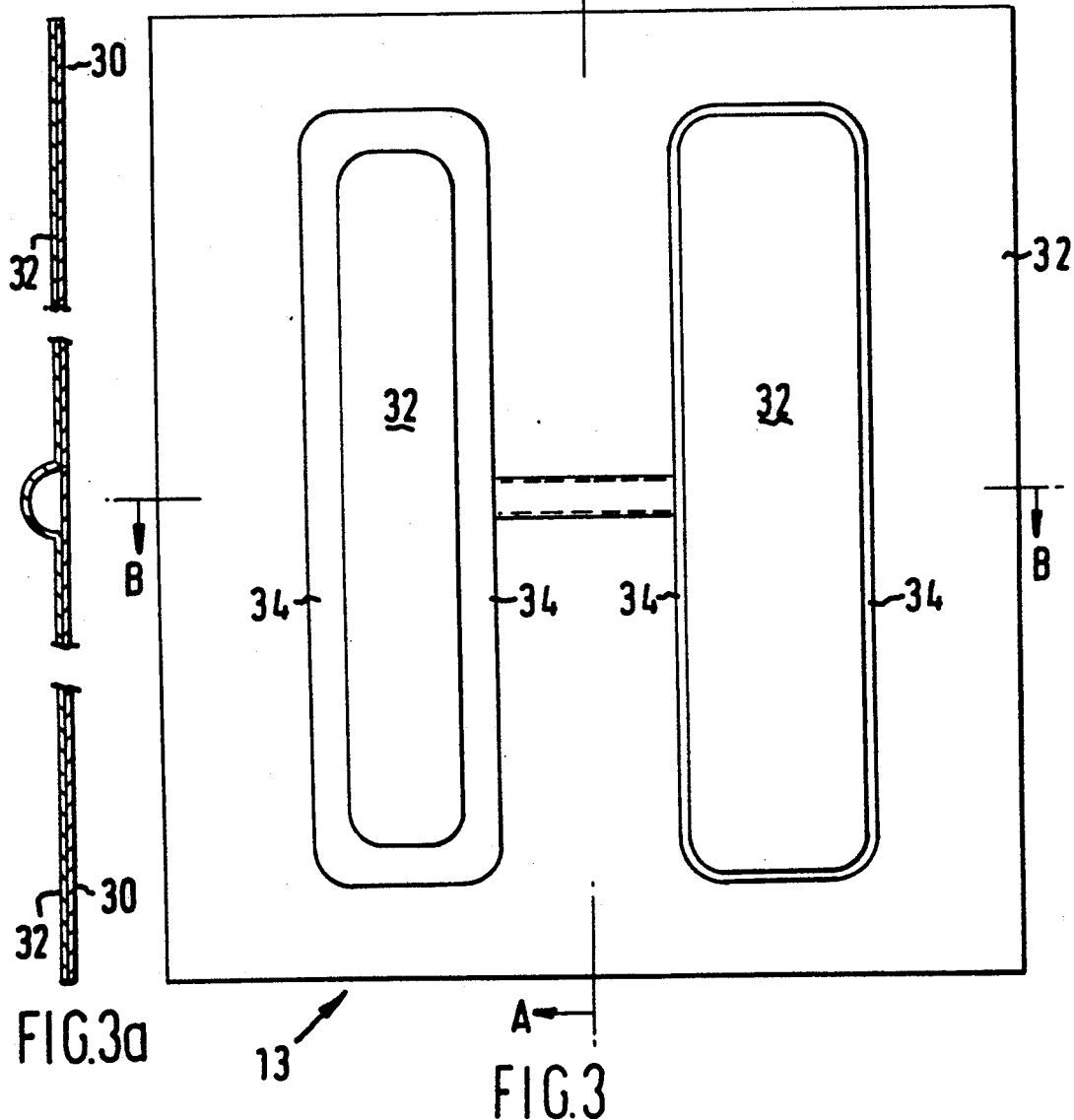
FIG.3a
FIG.3

PROCESS FOR PRODUCING COMPOSITE METALLIC STRUCTURES

The present invention relates to a process for producing composite bonded metallic structures which are suitable for subsequent superplastic forming.

The advantages of superplastic forming (SPF)/diffusion bonding (DB) process are well known, particularly in the aerospace industry. In a SPF/DB process, two or more metallic components are clamped together and heated to a temperature at which diffusion bonding can occur, and subsequently the diffusion bonded composite is heated to a temperature at which the material becomes superplastic, i.e. the material can be stretched by, for example, 100% without necking or fracturing. During the diffusion bonding step it is possible to prevent certain areas from diffusion bonding together by applying a stopping-off composition. A typical SPF/DB process might involve the clamping of two sheets together around their edges, the central area of the sheets having been stopped off, and heating the composite together at a diffusion bonding temperature until the edges have diffusion bonded together. The bonded composite is then transferred to a mould which holds the edges of the bonded sheets; pressurised gas is supplied to the region between the panels to expand the stopped off area superplastically until the composite conforms to the shape of the mould. The final product is an integral panel which has no fastenings holding it together. Complex structures can be formed by SPF/DB techniques.

The materials that can presently be used in SPF/DB processes are limited to uniform grain-size metals that do not form an inhibiting surface oxide. A suitable alloy for the aerospace industry is a titanium alloy containing 6% Al and 4% V.

It would be highly desirable to be able to form composite structures from aluminium and aluminium alloys by SPF/DB techniques but the surface aluminium oxide inhibits all diffusion bonding and despite the advantages of using aluminium over titanium it has not hitherto proved possible to form a composite aluminium structure using SPF/DB techinques. Thus, in order to make a composite aluminium structure by SPF, the various components must be individually superplastically formed and then the individual components must be joined e.g. by fasteners or by welding; this removes many of the benefits of SPF technology.

We have now developed a process in which aluminium and aluminium alloys can be formed into a composite structure using SPF techniques in which, prior to SPF, the components are joined together by explosive bonding followed by a heat treatment step. The resultant structure can be subject to SPF to provide a finished or semi-finished product.

According to the present invention there is provided a process of forming a bonded composite article made of one or more components at least one of which is made of a material having a protective surface layer, which process comprises applying a stopping-off composition to a discrete area of a first component, explosion bonding the first component to a second component so that the components are joined together in the contiguous areas to which the stopping-off composition had not been applied and heating the bonded articles at a temperature and for a time such as to increase the strength of the bond between the components and to partially inflate the stopped-off areas while still maintaining superplastic properties in the resulting bonded composite article.

preferably, the resulting composite article is then subject to superplastic forming.

The explosive-bonded composite is preferably heat treated to consolidate the bonds between the various components and stabilise the microstructure of the material; the heat treatment preferably involves four steps:

(1) Bond consolidation by diffusion.

This step allows atoms on either side of the explosive bond to inter-diffuse to increase the bonding strength. This step may be conducted at a temperature of 400° 500° C., preferably 420° to 480° C., e.g. 450° C. for at least 1 hour.

(2) Grain structure stabilisation.

Superplastic forming will be conducted at a temperature above the bond consolidation temperature, e.g. 520° to 580° C., typically at 530° C. to 560° C. The temperature should be increased gradually from the temperature of the bond consolidation step to the temperature at which superplastic forming will occur and we prefer to use a rate of temperature increase of not greater than 3° C./minute, preferably not greater than 2° C. and generally about 1° C./minute although we believe that slower rates can be used. Superplastic forming can take place immediately after this grain structure consolidation, in which case this consolidation can be conducted in the superplastic forming jig. However, superplastic forming can take place after a considerable interval during which the composite article is allowed to cool, optionally after one or both of the following two steps:

(3) Air or water quenching.

After the stabilisation step (and optionally the superplastic forming) the bonded (formed) article is air quenched or water quenched which prevents contaminants from precipitating. Air quenching is sufficient for lithium-aluminium alloys although for aluminium, water quenching is preferred.

(4) Aging.

The bonded or formed article is then subjected to an aging process, e.g. at 150° to 200° C., e.g. 170° to 180° C., for at least 5 hours, e.g. at least 24 hours and we have found that aging at 170° C. for 32 hours produces satisfactory results.

As has already been mentioned, superplastic forming is preferably conducted after step (2) although if desired it can be conducted after step (3) or after step (4). It is not necessary that step (2) should follow immediately after step (1) and the article can be allowed to cool before step (2), in which case the article may be reheated to the temperature of step (1) prior to step (2) being conducted. Likewise, it is not necessary that step (4) should follow immediately afte step (3). It is convenient if steps (1) and (2) and superplastic forming are conducted sequentially in the superplastic forming jig which has the advantage that the bonded article need not be transferred from furnace-to-furnace and also the advantage that the jig clamps the explosion bonded region and so prevents any disruption of the bond during heat treatment.

An additional advantage of the bond consolidation step is that it causes the stopping-off composition to outgas, that is to say it gives off a gas which partially inflates the article, thereby aiding breakthrough by pressurised gas in the subsequent superplastic forming step.

Explosive bonding is a well-known technique in which two metallic parts are cold-welded together by the force generated by the controlled detonation of an explosive. It is usually used for cladding a base metal, e.g. steel with a surface of a corrosion-resistant expensive metal, e,g. aluminium or titanium. It is known that explosive bonding of aluminium is not inhibited substantially by its surface oxide which is removed in the force of the controlled explosion but there has been no proposal to combine SPF and explosive bonding to overcome the problems of using aluminium in an SPF/DB process. Form GB-A-1,130,527 and 1,433,632 it is known to use stopping-off material to prevent explosion bonding in certain discrete areas.

It is commerically desirable for the surface of the superplastically formed article to be of as high a quality as possible but the action of the explosive in the explosive bonding step can degrade the surface against which it is placed. We have found that this degradation can be reduced or eliminated by placing a buffer, preferably of resilient material, between the explosive and the components that are to be bonded together and that the resilient material does not materially reduce the effectivenes of the explosion bonding, Resilient material that may be used include cardboard, plastics material, e.g. polyethylene or rubber. A layer of cardboard 2-3 mm in thickness has proved satisfactory.

The present invention can be applied to any metal whether or not it has a protective surface but it is of course primarily intended for aluminium and aluminium alloys and especially aluminium/lithium alloys.

The process of the present invention is applicable to forming a composite structure from two or more components, typically from two, three or four sheets. In forming a three-sheet structure, for example, stopping-off material may be supplied to both sides of one sheet which is then sandwiched between two other sheets and the three sheets are then subjected to explosion bonding so that they are bonded together. The bonded panel thus formed is subject to the heat-treatment. described above in which the explosion bond between the sheets is consolidated and the heat treatment also causes the stopping-off material to outgas which partly inflates the panel in the stopped-off areas thereby breaking apart the sheets in these areas. The sheets may then be superplastically formed to produce, for example, a panel having two outer parallel face sheets separated by a corrugated strengthening core formed by the central sheet which is bonded to the outer face sheets at the peaks of the corrugations. Likewise, a panel may be formed from a four-sheet structure which has two outer face sheets and a honeycomb inner structure formed by the two liner sheets.

The process of the present invention will now be described by way of example only with reference to the accompanying drawings in which:

FIG. 3 is a plan view of a panel produced by the process of the present invention, FIGS. 3a and 3b are sectioned views along lines A—A and B—B respectively of FIG. 3.

EXAMPLE 1

Figure 1:
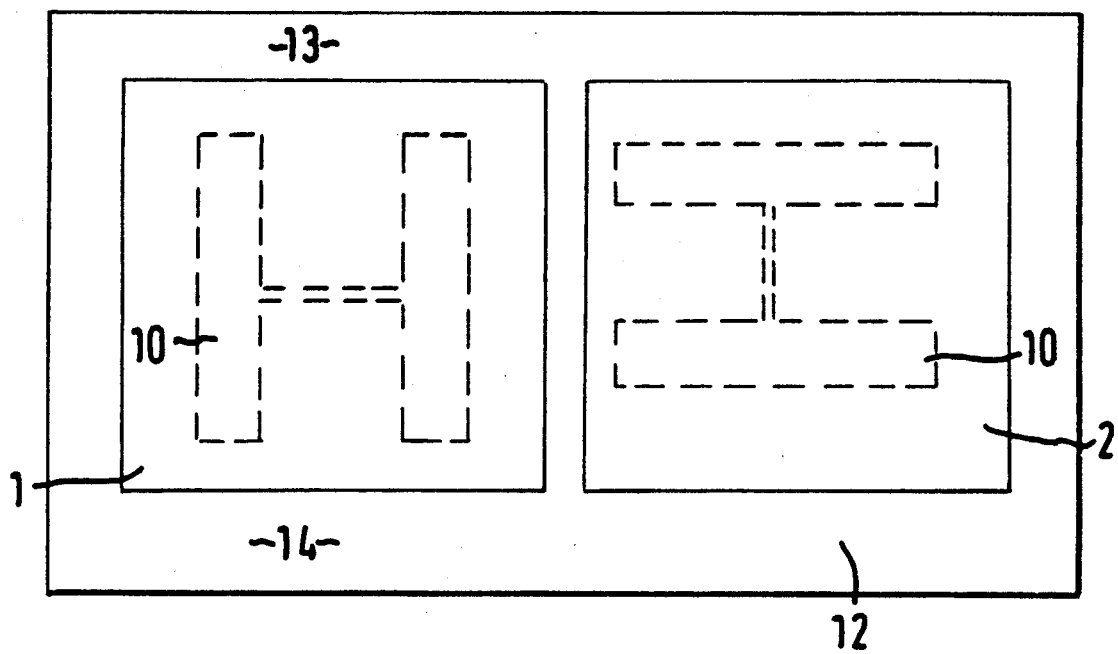
FIG. 1 is a plan view of a sheet used in a process of the present invention.

Referring to FIG. 1, a stopping-off composition was applied to two 'H'-shaped central areas 10 of a 3 mm thick sheet 12 of alloy 8090 (supplied by British Alcan) which is an aluminium lithium alloy having a composition: Li 2.2–2.7; Cu 1.0–1.6, Mg 0.6–1.3, Zr 0.04–0.16, Zn 0.25 max, Fe 0.3 max, Si 0.2 max, Mn 0.1 Max, Cr 0.1 max, Ti 0.1 max, with the balance being aluminium, but it is not suitable for DB/SPF processing because of its protective oxide surfaces. The sheet 12 is 850×1450 mm and is intended to produce two panels 1 and 2 each having a size of 600×600 mm. The sheet 12 has an initiation edge 13 and a run-out edge 14 that are 50 and 200 mm in width respectively. The 'initiation edge' is the edge above which the explosive in the explosive welding process is detonated while the 'run-out edge' is the edge opposite to the initiation edge (see below).

The stopping-off composition may be one traditionally used in SPF, for example an inert ceramic material in a volatile liquid vehicle and can be applied by any convenient technique; we use silk screen printing. Preferably, the stopping-off material is of the type described in EP-A-266,073.

Figure 2:
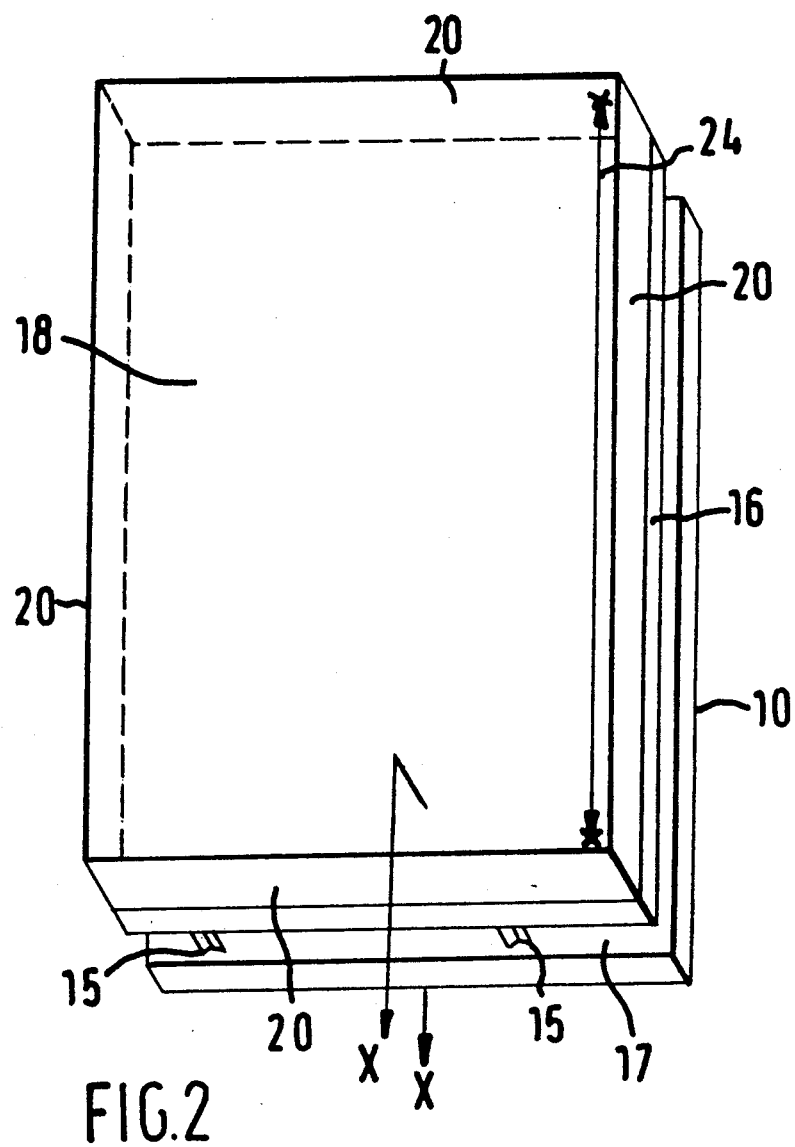
FIG. 2 is a perspective view from above and to the side of an arrangement for performing the explosive bonding step of the process of the present invention.

Referring now to FIG. 2, spacers 15 are placed on sheet 12, which is arranged with central stopped-off areas 10 uppermost, and a further sheet 16 of alloy 8090 but without any stopping-off is place on the spacers 15 so that it is spaced apart from sheet 12 by a gap 17 and a layer of explosive 18 retained by four cardboard walls 20 is placed on sheets 16; a 2 to 3 mm thick sheet of cardboard 19 is placed between the explosive 18 and the sheet 16 to minimise the damage to the outer surface of sheet 16 when the explosive is detonated. The explosive 18 is detonated by one or more detonators located along side 24 of the explosive and this causes the sheet 16 to be impacted against sheet 12 with such a force that the two sheets are cool welded together. Side 24 lies above the initiation edge 13 (See FIG. 1) of panel 12.

The amount and type of explosive should be chosen so that the two sheets 12 and 16 are welded together but they should not be substantially deformed in the process. The resultant cold weld need not be as strong as the full parent metal strength since the two sheets are further bonded in a subsequent heat treatment.

Figure 2A:
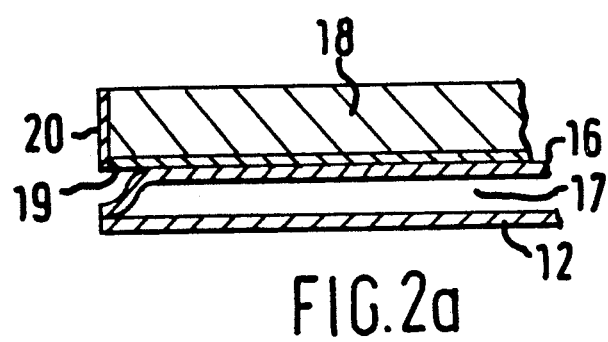
FIG. 2a is a detailed section along line X—X of FIG. 2 but shows a modification to the arrangement shown in FIG. 2.

Instead of using spacers 15, one and/or both of the sheets 12, 16 may be provided with flanges 24 (shown in FIG. 2a) to space the sheets 12, 16 apart.

The explosive bonding bonds the sheets 12, 16 together to form a laminate panel except in those areas 10 where the stopping-off composition is present.

Vent holes are then drilled in the central region 10 of one of the panels 12 or 16 to allow gas to escape during subsequent thermal treatment (described below) which might otherwise rupture the explosion bonded regions of the plate; the vent holes also provide a connection for gas during the inflation step in which the panel is superplastically formed to shape (also described below).

The edges 13, 14 of sheets 12, 16 are then trimmed and the sheets cut in two to produce two planar laminar panels 1 and 2 of the desired size.

One of the panels 13 is then clamped in a superplastic forming mould having the final shape of the desired component, shown in FIG. 3. The sheet in which the vent holes 28 were formed will become the base 30 of the finished panel and the sheet in which the vent holes were not drilled becomes the top sheet 32.

The laminar panel is then subjected to a heat treatent at 450° C. for 1 to 2 hours to consolidate the bonds formed during explosion bonding although other heat treatment conditions could be used; the mechanism for this consolidation is believed to result from diffusion. The temperature of the panel is then increased slowly by 1° C./minute up to the temperature of the superplastic forming temperature of 530° to 560° C.; if the temperature were increased otherwise quickly the metals can re-crystallise and lose their ability to be superplastically formed.

The panels is then subjected to superplastic forming during which compressed gas is fed into the interior of the mould below base sheet 30 and passes through the vent holes in base sheet 30 and 'inflates' the top sheet 32 until it assumes the shape of the mould. This superplastic forming can take some time to accomplish and the gas pressure should be varied according to known pressure/time cycles so that the stretched areas 34 of sheet 32 do not neck during superplastic forming. The gas pressure is then released and the mould opened to allow the formed panel to cool in ambient air. The panel can be finished, e.g. edges can be trimmed, and is subjected to a final aging step at 170° C. for 32 hours.

EXAMPLE 2

To assess the strength of the welds produced by the process of the present invention, a series of tests are performed.

Two sheets of aluminium/lithium alloy are explosion-bonded in the manner described above except that the sheets do not contain any stopping-off. Two different explosion bonding charges are used and each test is conducted on several samples; in the first explosion bonding process (Process 1), a minimum amount of explosive is used that is just sufficient to produce a bond between the two sheets while in the second process (Process 2) a larger amount of explosive is used that is sufficient to cause a wave-shaped weld between the sheets that is characteristic of an explosive bond.

The laminar sheet produced in Process 1 is flat and undistorted by the explosive bonding. If it were not for the cardboard sheet 19, the surface in contact with the explosive would be slightly contaminated by the explosive but even if cardboard sheet 19 were omitted, the contamination can be removed by a pickling solution. The interface between the two sheets shows good metal-metal contact bonding with only small areas in which no bond is formed. The laminar sheet produced by process 2 is bowed slightly by the explosive bonding conditions and the surface of the explosive side of the sheet shows a slight rippling effect. The interface between the sheets is strongly bonded.

Laminar sheets from both explosive bonding processes are then heat treated as shown in the following Table 1.

TABLE 1

| Sample | Explosion Bonding Process | Temperature of Heat Treatment (°C.) | Duration of Heat Treatment (minutes) |
|---|---|---|---|
| 1/120 | 1 | 450 | 120 |
| 2/60 | 2 | 450 | 60 |
| 2/120 | 2 | 450 | 120 |

Sample 2/120 is also subjected to an ageing and solution hardening treatment at 530° C. for 15 minutes and 180° C. for 5 hours.

The strength of the bonds on the samples before heat treatment and after heat treatment are tested by attempting to drive a wedge along the weld interface to separate the two sheets. The results are set out in Table 2, the samples before heat treatment are referred to as '1' and '2' to indicate the explosion bonding process used in their production while the nomenclature of Table 1 has been used for the heat-treated samples.

TABLE 2

| Sample | Weld Strength |
|---|---|
| 1 | Could open the weld with difficulty |
| 2 | Could not open the weld |
| 1/120 | Could open the weld but only with even greater difficulty than sample 1 |
| 2/120 | Could not open the weld. |

EXAMPLE 3

Figure 4:
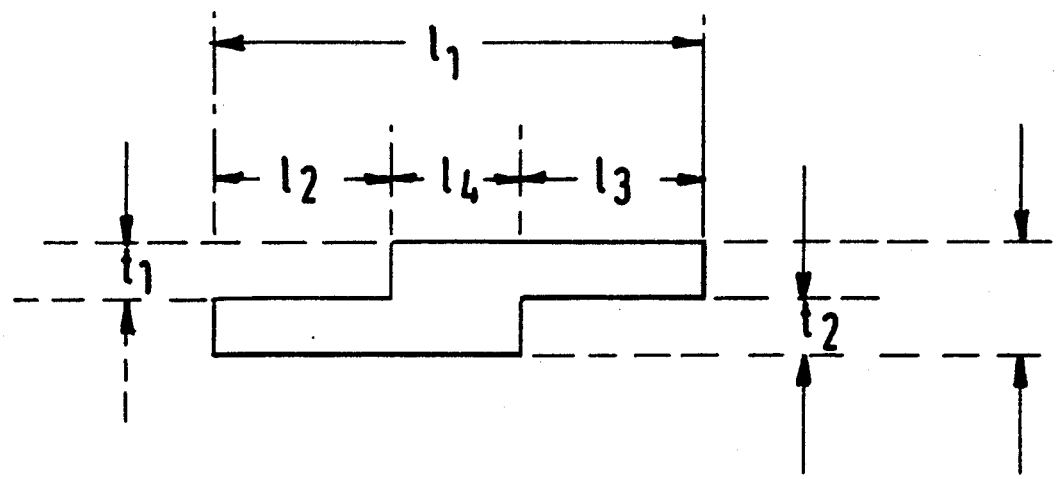
FIG. 4 is a side elevation of a specimen used in the tests described in Example 3.

In each of six tests, two sheets of alloy 8090 were explosion bonded together as described above but without any stopping-off material between them. The explosion bonding produced a wave pattern at the interface between the sheets; four specimens were machined from each sheet, the shape of the specimens being shown in FIG. 4. The length of each speciman $1_1$ is 27 mm, each end being 10 mm in length ($1_2$ and $1_3$) which of course makes the length of the overlap ($1_4$) 7mm. The width of the specimens was 20 mm and the thickness of each end ($t_1 = t_2$) was 3 mm making the thickness in the overlapping area 6 mm. In two of the specimens the crests of the waves lay parallel to the longitudinal axis of the specimens (these specimens were denoted 'T') and in two of the specimens the crests of the waves lay perpendicular to the longitudinal axis of the specimens (these specimens were denoted by the letter 'L'). In each test, one T specimen and one L specimen were heat treated by:

(1) heating the specimen at 450° C. for 1 hour;
(2) heating the specimen gradually to 530° C. at a rate of 1° C. per minute;
(3) air quenching the specimens, i.e. letting them cool to room temperature in ambient air;
(4) aging the specimens at 170° C. for 32 hours. The other two specimens were not subject to any heat treatment.

The ends of the specimens were clamped in a test jig and subjected to shear tests by pulling the ends of the specimen until the lap failed. The results are shown in Table 3.

TABLE 3

| | LAP SHEAR STRESS MN/M$^2$ | | | |
|---|---|---|---|---|
| TEST | As bonded | | Heat treated | |
| NUMBER | T | L | T | L |
| 1 | 203.61 | 201.89 | 232.6 | 220.6 |
| 2 | 187.42 | 199.83 | 226.3 | 242.7 |
| 3 | 203.75 | 195.23 | 215.8 | –223.6 |
| 4 | 207.57 | 196.90 | 241.3 | 206.6 |
| 5 | 183.51 | 184.94 | 219.7 | 238.0 |
| 6 | 208.83 | 199.77 | 238.0 | 223.5 |
| Average | 199.1 | 196.4 | 228.9 | 225.8 |

The results show the benefit of the heat treatment step.

I claim:

1. A process of forming a bonded composite article made of two or more components, at least one of which is made of a material having a protective surface layer and at least one of which is made of a material that can be superplastically formed, which process comprises applying a stopping-off material to a discrete area of a first component, juxtaposing the first component with a second component so that the said discrete area lies between the first and second components, placing an explosive adjacent to one of the components, explosion bonding the first and second components together to form a composite article in which the components are joined together in areas to which the stopping-off material had not been applied and heat treating the composite article:

(a) at a temperature at which diffusion bonding can occur for a time such as to increase the strength of the bond between the components and to partially inflate the stopped-off area while still maintaining superplastic properties of the superplastic component(s), and (b) in a step in which the temperature of the composite article is gradually increased from the said diffusion bonding temperature to a temperature at which superplastic forming can take place, the rate of the said increase in temperature not exceeding 3° C. per minute.

2. A process as claimed in claim 1, wherein the material having a protective surface layer is aluminium or an aluminium alloy.

3. A process as claimed in claim 1 wherein the said diffusion bonding temperature is in the range of 400° to 500° C.

4. A process as claimed in claim 3, wherein the said temperature is in the range of 420° to 480° C.

5. A process as claimed in claim 4, wherein the said temperature is about 450° C.

6. A process as claimed in claim 1 wherein the said rate of increase in temperature does not exceed 2° C. per minute.

7. A process as claimed in claim 6, wherein the said rate of increase in temperature is about 1° C. per minute.

8. A process as claimed in claim 1 wherein the composite article is cooled from the superplastic forming temperature by means of a quench selected from the group consisting of an air quench and a water quench.

9. A process as claimed in claim 1, wherein the said heat treatment comprises aging the composite article.

10. A process as claimed in claim 9, wherein the composite article is superplastically formed after the said aging.

11. A process as claimed in claim 8, wherein the composite article is superplastically formed after the said quench.

12. A process as claimed in claim 9, wherein the said aging is performed at a temperature of 150° to 200° C.

13. A process as claimed in claim 12, wherein the said aging is performed at a temperature of 170° to 180° C.

14. A process as claimed in claim 9, wherein the said aging is performed for at least 5 hours.

15. A process as claimed in claim 14, wherein the said aging is performed for at least 24 hours.

16. A process as claimed in claim 15, wherein the said aging is performed for at least 30 hours.

17. A process as claimed in claim 1 wherein the composite article is superplastically formed after the said gradual heating step.

18. A process of forming a composite article having an internal cavity from at least two components, at least one of which is made of a material that has a protective surface layer and at least one of which is made of a material that can be superplastically formed, which process comprises:

(1) applying a stopping-off material to a discrete area of the first component;

(2) juxtaposing the first component with a second component so that the said discrete area lies between the first and second components;

(3) placing an explosive adjacent to one of the components;

(4) explosion bonding the first and second components together to form a composite article in which the components are joined together in areas to which the stopping-off material had not been applied, which areas surround the said discrete area to which the stopping-off material has been applied;

(5) subjecting the composite article to a heat treatment;

(a) at a temperature at which diffusion bonding can occur and for a time sufficient to increase the strength of the bond and to partially inflate the stopped-off area while maintaining the superplastic properties of the superplastic component(s), and (b) in a step in which the temperature of the composite article is gradually increased from the said diffusion bonding temperature to a temperature at which superplastic forming can take place, the rate of the said increase in temperature not exceeding 3° C. per minute; and (6) passing pressurised fluid into the stopped-off area to expand the stopped-off area so that it forms the said cavity and to form the composite article superplastically to its desired shape.

19. A process as claimed in claim 18 wherein the composite article is cooled from the superplastic forming temperature by means of a quench selected from the group consisting of an air quench and a water quench.

20. A process as claimed in claim 18, which comprises aging the composite article.

21. A process as claimed in claim 18 wherein the superplastic forming is performed after the said gradual heating step.

22. A process as claimed in claim 19, wherein the superplastic forming is performed after the said quench.

23. A process as claimed in claim 20, wherein the superplastic forming is performed after the said aging.

* * * * *